D. F. MORGAN.
PNEUMATIC TIRE.
APPLICATION FILED FEB. 6, 1918.
1,280,808.
Patented Oct. 8, 1918.
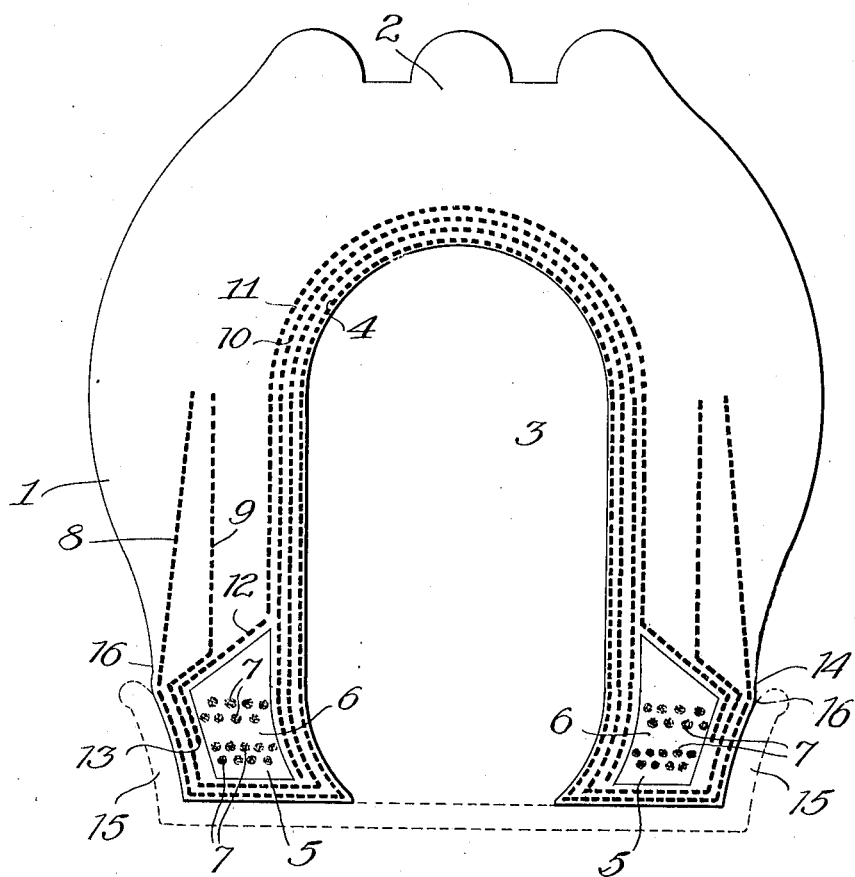

UNITED STATES PATENT OFFICE.

DELEVAN F. MORGAN, OF CHICAGO, ILLINOIS, ASSIGNOR TO HOFMANN-MORGAN RUBBER COMPANY, OF CHICAGO, ILLINOIS, A CORPORATION OF ILLINOIS.

PNEUMATIC TIRE.

1,280,808.	Specification of Letters Patent.	Patented Oct. 8, 1918.

Application filed February 6, 1918. Serial No. 215,566.

*To all whom it may concern:*

Be it known that I, DELEVAN F. MORGAN, a citizen of the United States, residing at Chicago, in the county of Cook and State of Illinois, have invented a new and useful Improvement in Pneumatic Tires, of which the following is a specification.

My invention relates, more, particularly, to pneumatic tires for trucks and other relatively heavy vehicles, wherein it is desired that the tires be of sufficient resiliency to relieve the vehicle of undue shock and vibration in passing over rough roads, my improvements having been devised for embodiment, more particularly, in tires wherein the outer casing is built in a reinforced manner, to present a pair of spaced stanchion-like, relatively rigid, ring-portions at opposite sides of, and forming the walls of, the channel which is disposed about the inner periphery of the casing and contains the inflatable inner tube and a connecting section, preferably of arc-shape in cross-section, connecting the outer margins of said ring-portions, and which is relatively resilient, the said portions of the casing being formed into an integral structure and the whole being so formed and proportioned that the load applied to the tire exerts force against said ring-portions substantially in a line with the latter.

As tires have been hitherto constructed, they present the serious disadvantage, especially if run for a considerable distance in wholly or partially deflated condition, of pumping mud and water into the joint between the tire and the rim, which produces rusting of the rim, causing the tire to adhere thereto, and oftentimes penetrates to the central portion of the rim, causing deterioration of the casing and inner tube. Furthermore tires as hitherto constructed present the objection, when run in wholly or partially deflated condition, of stripping of the rubber from the reinforcement, which seriously impairs the tire.

My primary objects are to provide for the overcoming of these objections and to provide for such a distribution of the reinforcement as to augment the stiffness of the ring-like-portions of the casing.

In the accompanying drawing, a tire constructed in accordance with my invention is shown in cross-section.

The tire casing, as illustrated, is formed of the ring-like portions 1, which are spaced apart in substantially parallel relation and with the outer peripheral portion 2 of the casing, present a channel 3 about its inner periphery for the inflatable inner tube (not shown), the casing at its peripheral portion being of arc-shape in cross-section as shown, and the portion at which the tire engages the ground in the use of the tire, being of a width at least as great as the width of the channel 3.

The casing 2 is made up of rubber and reinforcing material, preferably biased fabric coated with rubber as is commonly employed in the manufacture of pneumatic tires, the fabric forming the reinforcement for the casing. In the particular construction illustrated, the side walls of the channel 3 and the arc-shape wall at the peripheral edge of the channel have embedded therein, four layers of reinforcement, illustrated at 4, these layers being disposed throughout the length of the channel. The two innermost layers of reinforcement extend around the bottom and sides of relatively non-extensible annular members 5, which may be of any suitable construction, but which preferably are formed of a body of relatively hard rubber represented at 6, in which two sets of retaining wires 7 are embedded. The extremities of the two innermost layers of reinforcement 4 are extended outwardly beyond the retaining rings 5, as represented at 8 and 9, respectively, to be relatively widely spaced apart and the portion 9 to be relatively widely spaced from the outermost layer of reinforcement extending about the channel 3, the sections 8 and 9, which are of ring-shape to be co-extensive with the circumference of the tire, being embedded in the rubber forming the ring portions 1 of the casing. The layer of reinforcement represented at 10 and which is the third layer of the reinforcement for the walls of the channel 3, extends inwardly adjacent the inner sides of the rings 5, as represented in the drawing, terminating adjacent the inner peripheries of these rings. The fourth layer of reinforcement for the walls of the channel 3 and represented at 11, extends inwardly to a point adjacent the outer peripheries of the rings 5 and thence is deflected outwardly, as represented at 12 and at the outer surfaces of the rings 5 again deflected toward the diametric center of the casing, as represented at 13, the portions 12 and 13 of the strip 11 being overlaid by the adjacent portion of the strip which terminates in the portion 9, and thus becomes interlocked thereby in the finished tire.

In the manufacture of the tire, it is preferred that the various layers of the fabric be applied in taut condition to an annular core of the cross-section of the channel 3, to position the layers as shown in the drawing, with the retaining rings 5 positioned relative to the reinforcement as shown. The rubber to form the sheathing for the tire casing is then applied to the outer surface of the exposed reinforcement, the rubber thus applied being also laid in between the sections 8 and 9 of reinforcement and the section 9 and the body of reinforcement extending adjacent the inner surface of the walls of the channel 3. The structure thus formed is then introduced into a mold and the tire molded to the shape shown in accordance with usual methods.

It will be noted from the foregoing that the ring-like sections 8 and 9 of reinforcement not only serve to stiffen the ring-like portions 1 of the casing, but they also serve to prevent stripping of the rubber from the main body of reinforcement at the inner surfaces of the channel 3, because of the fact that each extends outwardly into the body of rubber and in such spaced relation to each other and to the adjacent main reinforcement that each is anchored to a relatively heavy body of rubber, and before the stripping of the rubber from the outer surface of the main reinforcement which extends along the inner side of the channel 3 can occur, it must strip from the sections 8 and 9.

Furthermore in the molding of a tire, the pressure applied is in a direction from the inner periphery of the tire toward its outer periphery, which oftentimes causes the reinforcement to buckle, as tires have commonly been hitherto produced, which results in a defective tire being produced. By arranging the reinforcement in accordance with that illustrated and described the strips of reinforcement are maintained against buckling under the pressure applied, as stated, and buckling of the reinforcement is prevented.

Another feature of my invention and which relates to that of preventing the pumping action hereinbefore referred to, consists in so shaping the outer sides of the casing that no part of the rubber beyond the areas at which the casing normally bears laterally against the rim-flange, will be caused to move into engagement with the marginal portions of the rim-flanges in the compressing of the rubber in the movement of the tire over the road, and the sides of the tire directly opposing the inner surfaces of the rim-flanges are caused to remain at all times in close engagement with the rim-flanges, which present a condition wherein the pumping action referred to is prevented. In the particular illustrated embodiment of my invention, the outer lateral casing-surfaces, represented at 14, and located beyond and contiguous to, the areas of contact 16 of the casing with the sides of the rim-flanges 15, do not extend laterally beyond these areas of contact 16 and the tire is held at all times against the inner surfaces of the rim-flanges by reason of the slight tendency of the tire to bulge outwardly. By thus shaping the portions 14 of the casing, and it may be here stated that if desired, the portions 14 instead of being made of the shape shown, may recede from the extreme outer edges of the areas 14, toward the channel 3, the portions 14 of the casing remain out of contact with the flanges 15 at all times in the movement of the tire over the road under load, even when the tire is deflated, thereby preventing wear of the casing outwardly beyond the areas 14 and in connection with the engagement of the sides of the tire with the inner faces of the rim-flanges, preventing the pumping action hereinbefore referred to. In this connection, and in further explanation of the advantage afforded by thus shaping the casing beyond the areas 14, it may be stated that where the portion of the casing beyond these areas is so shaped that it is caused to move into and out of contact with the rim-flanges beyond the areas 14, mud and water entering the space between the rim-flanges and the portions of the casing just referred to, will be caused to be forced into the joint between the casing and the rim-flanges when the casing is moved into contact with the rim-flanges beyond said areas and this condition, as will be readily understood from the foregoing, is entirely avoided by my construction.

It is preferred that the tire be provided of such proportions for attachment to a rim of given diameter that when applied to the rim, the tire will be placed under circumferential tension at its inner periphery, which will cause the portions of the tire engaging the body of the rim and its flanges to snugly fit the outer periphery of the body-portion of the rim and be forced against, and snugly fit, the inner surfaces of the rim-flanges. The rim of the wheel carrying the flanges 15 is shown diagrammatically in the drawing merely to illustrate the position of the particular illustrated embodiment of my invention relative to these rim-flanges.

While I have illustrated and described a particular embodiment of my invention, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent is—

1. A pneumatic tire element formed of an annular member of resilient material having a channel about its inner periphery, with reinforcing material located in the walls of said channel adjacent the inner surface thereof, and a strip of reinforcing material extending outwardly from the base of said element toward its tread portion at each side of said channel relatively widely spaced from the adjacent reinforcing material located adjacent the inner surface of said channel, and embedded in said resilient material, whereby a substantial thickness of said resilient material is interposed between said portions of reinforcing material.

2. A pneumatic tire element formed of an annular member of resilient material having a channel about its inner periphery, with reinforcing material located in the walls of said channel adjacent the inner surface thereof, and a plurality of strips of reinforcing material extending outwardly from the base of said element toward its tread portion at each side of said channel; the strips at each side of said channel being relatively widely spaced from each other and from the adjacent reinforcing material located adjacent the inner surface of said channel, said strips being embedded in said resilient material, whereby a substantial thickness of said resilient material is interposed between the adjacent ones of said strip and between the latter and the reinforcing material adjacent the inner surfaces of said channel.

3. A pneumatic tire element formed of an annular member of resilient material having a channel about its inner periphery, with reinforcing material located in the walls of said channel adjacent the inner surface thereof, and a strip of reinforcing material at each side of said channel and formed as a continuation of said first-referred-to reinforcing material, said strips extending outwardly from the base of said element toward its tread portion and relatively widely spaced from the first-referred-to reinforcing material and embedded in said resilient material, whereby a substantial thickness of said resilient material is interposed between said portions of reinforcing material.

4. A pneumatic tire element formed of an annular member of resilient material having a channel about its inner periphery, said element being formed with retaining rings therein in its base portion at opposite sides of said channel, reinforcing material located in the walls of said channel adjacent the inner surface thereof and extending through said rings with its edge portions extending outwardly from the base of said element toward its tread portion and beyond said rings at each side of said channel, the edge portions of said reinforcement being relatively widely spaced from the portion of said reinforcing material located adjacent the inner surfaces of said channel, and embedded in said resilient material, whereby a substantial thickness of said resilient material is interposed between said portions of reinforcing material.

DELEVAN F. MORGAN.